(12) United States Patent
Izumi et al.

(10) Patent No.: US 7,095,319 B2
(45) Date of Patent: Aug. 22, 2006

(54) METHOD AND APPARATUS FOR LOCATION SEARCH OF PORTABLE DEVICE IN WIRELESS COMMUNICATIONS SYSTEM

(75) Inventors: Yuji Izumi, Kokubunji (JP); Masaki Nose, Shiki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 244 days.

(21) Appl. No.: 10/820,038

(22) Filed: Apr. 8, 2004

(65) Prior Publication Data

US 2004/0239530 A1 Dec. 2, 2004

(30) Foreign Application Priority Data

May 30, 2003 (JP) ............................. 2003-155467

(51) Int. Cl.
*H04Q 7/00* (2006.01)
(52) U.S. Cl. .................... 340/539.11; 340/539.21; 340/573.4; 342/457
(58) Field of Classification Search .............. 340/425.5
See application file for complete search history.

(56) References Cited

U.S. PATENT DOCUMENTS

| | | | | |
|---|---|---|---|---|
| 5,461,390 A | * | 10/1995 | Hoshen | 340/573.4 |
| 5,883,598 A | * | 3/1999 | Parl et al. | 342/457 |
| 6,259,406 B1 | * | 7/2001 | Sugiura et al. | 342/457 |
| 6,300,875 B1 | * | 10/2001 | Schafer | 340/573.1 |
| 6,353,390 B1 | * | 3/2002 | Beri et al. | 340/572.1 |
| 6,362,783 B1 | | 3/2002 | Sugiura et al. | |
| 6,456,239 B1 | | 9/2002 | Werb et al. | |
| 6,529,164 B1 | | 3/2003 | Carter | |
| 6,674,403 B1 | * | 1/2004 | Gray et al. | 342/463 |
| 6,760,770 B1 | * | 7/2004 | Kageyama | 709/229 |
| 6,799,047 B1 | * | 9/2004 | Bahl et al. | 455/456.1 |
| 6,975,941 B1 | * | 12/2005 | Lau et al. | 340/539.13 |

FOREIGN PATENT DOCUMENTS

| | | |
|---|---|---|
| JP | 10-221425 | 8/1998 |
| JP | 11-178045 | 7/1999 |
| JP | 2000-209641 | 7/2000 |
| JP | 2001-75977 | 3/2001 |

OTHER PUBLICATIONS

European Search Report Issued Dec. 21, 2004 in European Application No. 04006980.9.

* cited by examiner

*Primary Examiner*—Daniel Wu
*Assistant Examiner*—Eric M. Blount
(74) *Attorney, Agent, or Firm*—Finnegan, Henderson, Farabow, Garrett & Dunner, L.L.P.

(57) ABSTRACT

There is disclosed a location search system which detects a position coordinate of a data processing device based on received radio wave information transmitted from the data processing device having a wireless communications function. The location search system includes a server including a search unit which searches region information specifying a location of the data processing device from a region information database based on calculated position coordinate information.

7 Claims, 11 Drawing Sheets

| Range No. | Coodinate 1 | Coodinate 2 | Floor | Space name | Control code |
|---|---|---|---|---|---|
| 00102 | 10, 30 | 40, 50 | 3 | Laboratory B | office area |
| 00102 | 40, 40 | 60, 50 | 3 | Laboratory B | office area |
| 00103 | 10, 10 | 40, 30 | 3 | Meeting room A | common area |
| 00104 | 0, 0 | 100, 10 | 3 | South-side corridor | common area |
| 00105 | 0, 10 | 10, 40 | 3 | Bathroom | private area |
| 00106 | 40, 10 | 60, 40 | 3 | Stairwell | common area |
| 00107 | 0, 40 | 10, 50 | 3 | Machine room | security area |
| 00106 | 40, 10 | 60, 40 | 4 | Stairwell | common area |
| 02007 | 0, 10 | 10, 40 | 4 | Bathroom | private area |

| Range No. | Coodinate 1 | Coodinate 2 | Floor | Space name | Entrance/exit | | Control code |
|---|---|---|---|---|---|---|---|
| 00102 | 10, 30 | 40, 50 | 3 | Laboratory B | 15, 30 | 20, 30 | office area |
| 00102 | 40, 40 | 60, 50 | 3 | Laboratory B | 45, 40 | 50, 40 | office area |
| 00103 | 10, 20 | 40, 30 | 3 | Meeting room A | 40, 20 | 40, 25 | common area |
| 00103 | 10, 10 | 40, 20 | 3 | Meeting room A | 15, 10 | 20, 10 | common area |
| 00104 | 0, 0 | 100, 10 | 3 | South-side corridor | | | common area |
| 00105 | 0, 10 | 10, 40 | 3 | Bathroom | 0, 10 | 5, 10 | private area |
| 00106 | 40, 10 | 60, 40 | 3 | Stairwell | 40, 10 | 60, 10 | common area |
| 00107 | 0, 40 | 10, 50 | 3 | Machine room | 5, 50 | 10, 50 | security area |

| Date | Time | Range No. | Space name | Business |
|---|---|---|---|---|
| 2003/03/10 | 09:00-11:00 | 00138 | Office A | Coding |
| 2003/03/10 | 11:00-12:00 | 00103 | Meeting room A | Progress meeting |
| : | : | : | : | : |
FIG. 13
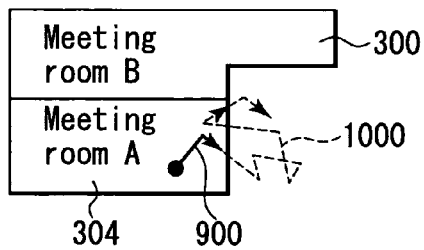
FIG. 14
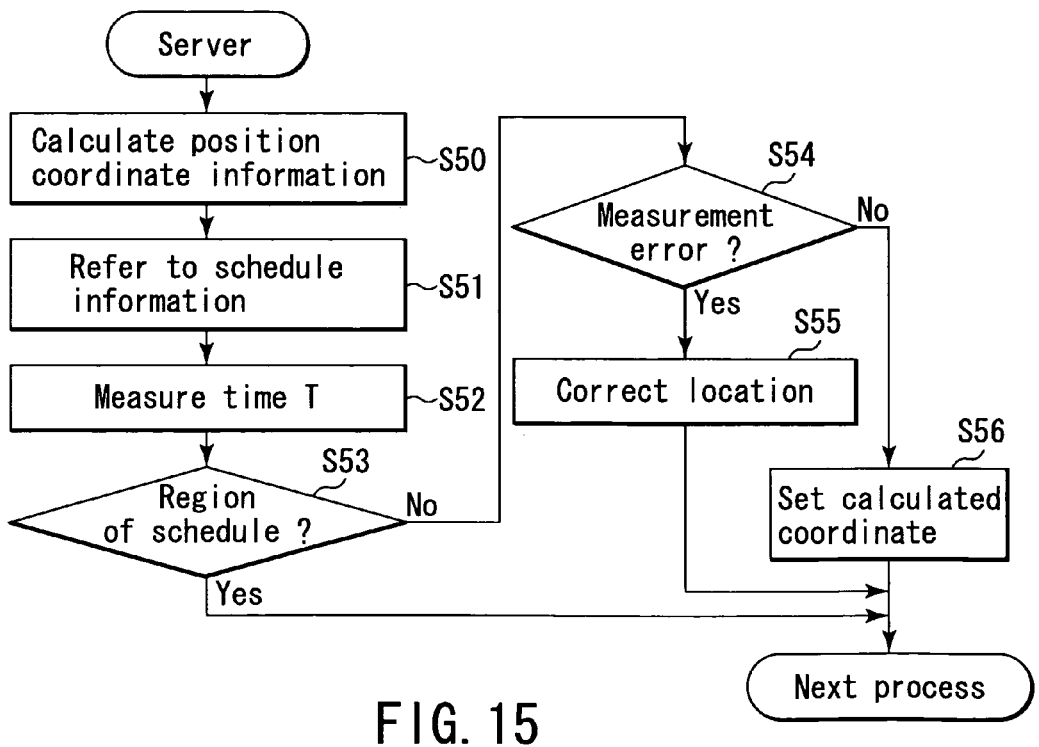
FIG. 15

METHOD AND APPARATUS FOR LOCATION SEARCH OF PORTABLE DEVICE IN WIRELESS COMMUNICATIONS SYSTEM

CROSS-REFERENCE TO RELATED APPLICATIONS

This application is based upon and claims the benefit of priority from prior Japanese Patent Application No. 2003-155467, filed May 30, 2003, the entire contents of which are incorporated herein by reference.

BACKGROUND OF THE INVENTION

1. Field of the Invention

The present invention generally relates to a wireless communications system, particularly to a location search technique of searching a location of a portable device.

2. Description of the Related Art

In recent years, location detection systems using a global positioning systems (GPS), a radio local area network (LAN), a radio tag and the like have been developed. In fields of mobile communications systems such as a cellular phone and PHS, a location search system has been developed using radio waves from a base station (e.g., see Jpn. Pat. Appln. KOKAI Publication No. 10-221425).

A system for managing a location of a user having portable devices (data processing devices) such as the cellular phone and a personal digital assistant (PDA) on premises such as an office building of a company, a shopping center, or public facilities such as stations and hospitals has not been practically used.

To realize this system, simply the system for detecting a position of the portable device on the map (on the plane) is insufficient. Especially, a system is necessary which is capable of specifying a region where the user is positioned among regions such as rooms and passages existing every floor on the premises (sometimes referred to as a three-dimensional spatial range or simply the spatial range).

BRIEF SUMMARY OF THE INVENTION

In accordance with one embodiment of the present invention, there is provided a location search system including facilities to search a location of a data processing device by a region unit especially on premises in a wireless communications system.

The system for location search of a data processing device including a wireless communications unit and a unit to output received radio wave information for location detection, the system comprising: a unit which acquires the received radio wave information from the data processing device by wireless communications; a location detection unit which calculates position coordinate information to specify a location of the data processing device based on the received radio wave information; a region information database in which region information is stored to designate a spatial range associated with the position coordinate information; and a search unit which searches the region information corresponding to the position coordinate information calculated by the location detection unit from the region information database.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 13 is a diagram showing one example of schedule information according to the fifth embodiment;

FIG. 14 is an explanatory view of the operation of the system according to the fifth embodiment; and FIG. 15 is a flowchart showing the operation of the server according to the fifth embodiment.

DETAILED DESCRIPTION OF THE INVENTION

Embodiments of the present invention will be described hereinafter with reference to the drawings.

FIRST EMBODIMENT

Figure 1:
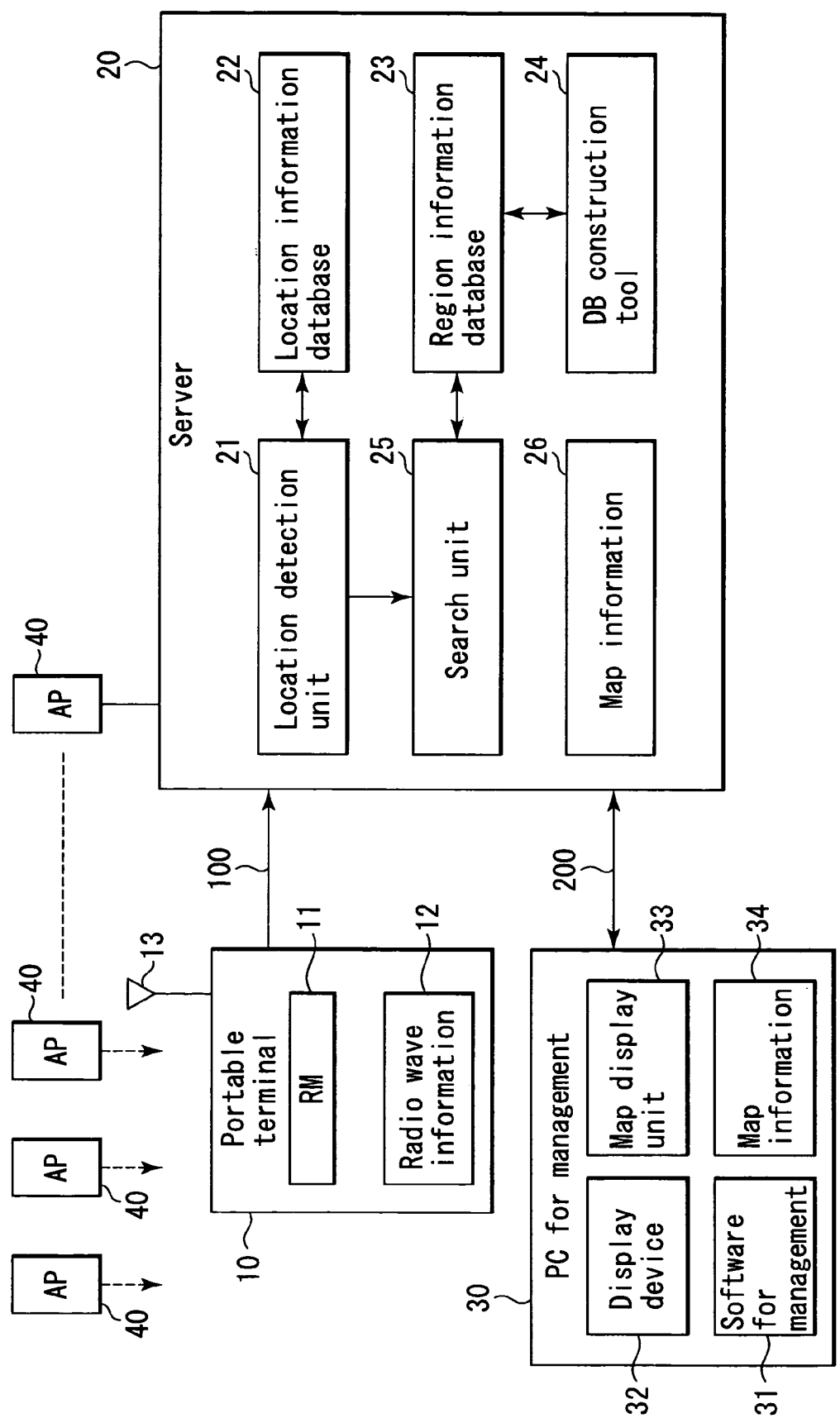
FIG. 1 is a block diagram showing a system constitution according to a first embodiment of the present invention.

FIG. 1 is a block diagram showing a system constitution according to the present embodiment.

The present system includes a computer for management (hereinafter referred to as the PC for management) 30 which manages locations of specific users such as employees, actually portable terminals operated by the users on premises such as an office building.

It is assumed that each user carries a portable terminal (a data processing device) 10 including wireless communications functions such as PDA and cellular phone. The portable terminal 10 includes a wireless communications circuit 11 which executes a wireless communications process, a radio wave measurement unit (radio wave measurement engine) 12 which produces received radio wave information, and an antenna for transmission/reception 13.

Here, relay devices for wireless communications (hereinafter referred to as the access points) 40 are disposed in a plurality of positions every floor on the premises. The portable terminal 10 executes wireless communications with the respective access points 40. A server 20 executes wire communications or wireless communications with the respective access points 40. Moreover, the portable terminal 10 and server 20 are capable of exchanging data by the wireless communications. Furthermore, the PC for management 30 is connected to the server 20 in such a manner that data communications are possible (wireless or wire).

The portable terminal 10 measures intensities of radio waves from one or more access points (AP) 40, received by the antenna 13, by the radio wave measurement unit, and produces received radio wave information 100 including results of the measurement and identification information of the AP 40 to transmit the information to the server 20.

The server 20 includes a location detection unit (location calculation engine) 21, a location information database (location information DB) 22, a region information database (region information DB) 23, a tool 24 for constructing the region information DB 23, a search unit (search engine) 25, and a storage unit 26 in which map information is stored. These constituting elements 21 to 26 are realized by hardware (CPU and memories) and software.

The location information database 22 accumulates location information groups indicating correlations between radio wave intensities and locations for each floor on the premises. The location detection unit 21 uses the received radio wave information 100 transmitted from the portable terminal 10 to calculate position coordinate information (see coordinates 1, 2 shown in FIG. 2) for each floor based on the location information searched from the location information database 22.

The search unit 25 searches the region information corresponding to the position coordinate information detected by the location detection unit 21 from the region information database 23. The region information is information for specifying the region (spatial range) on the premises as described later, and includes spatial range identification information (range code No.), floor number, space name, and control information (control code) (see FIG. 2).

The search unit 25 has a function of transferring the position coordinate information and region information to the PC for management 30. The search unit 25 converts the floor number and space name to text data and outputs the data. Here, the position coordinate information, region information, and map information described later are generically referred to as location search information 200.

The server 20 takes map image information (sometimes referred to simply as the map) on the premises corresponding to the searched region information from the map information stored in the storage unit 26 in addition to the region information from the search unit 25, and transfers the information as the location search information 200 to the PC for management 30.

The PC for management 30 includes software for management 31, display device 32, map display unit (map display engine) 33, and storage unit 34 in which the map information is stored. The software for management 31 is a tool for managing the location of the portable terminal 10 on the premises, and is executed by CPU of the PC 30.

The display device 32 includes a display and display control unit for displaying the map or the region information by the control of the map display unit 33. The map display unit 33 executes a production process of display information so as to plot the location of the portable terminal 10 on the map from the location search information 200 including the map information supplied from the server 20. The storage unit 34 stores the map information from the server 20, and map information inputted beforehand.

(Operation of System)

An operation of the present embodiment will hereinafter be described with reference to FIGS. 2 to 5 in addition to FIG. 1.

Figure 4:
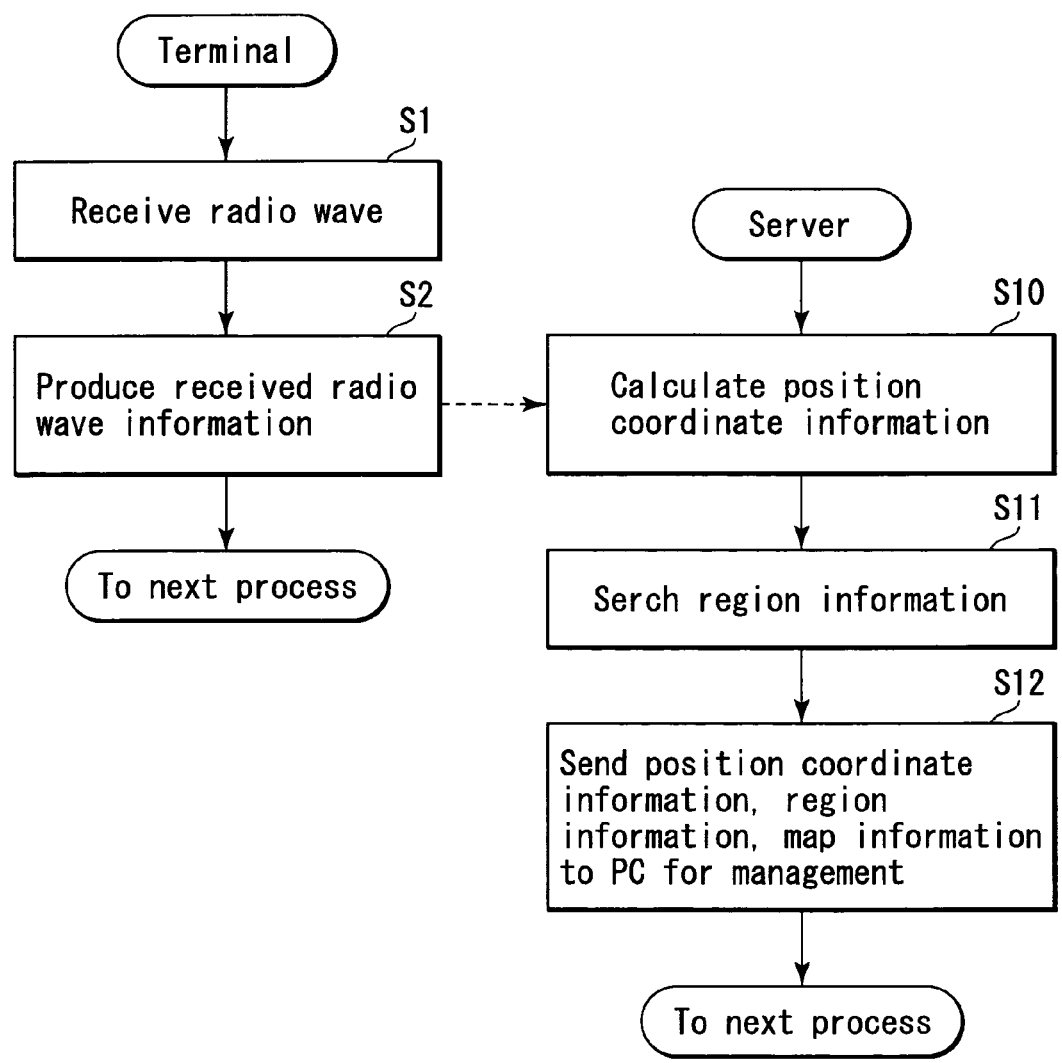
FIG. 4 is a flowchart showing the operation of a server according to the present embodiment.

First, as shown in a flowchart of FIG. 4, on receiving radio waves from the access point 40 disposed on the premises, the portable terminal 10 carried by a user (employee) produces the received radio wave information 100 to transmit the information to the server 20 (steps S1, S2). Here, it is assumed that the user having the portable terminal 10 is, for example, on a floor 3F on the premises as shown in FIG. 3.

In the server 20, the location detection unit 21 uses the location information database 22 to calculate the position coordinate information of 3F floor based on the received radio wave information 100 transmitted from the portable terminal 10 (step S10).

Furthermore, the search unit 25 searches the region information corresponding to the position coordinate information detected by the location detection unit 21 from the region information database 23 (step S11).

Figures 2, 3:
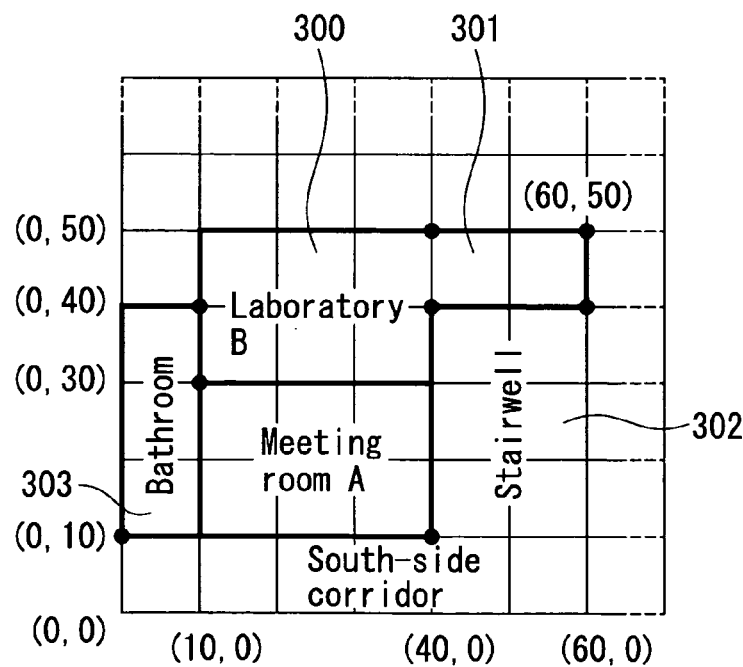
FIG. 2 is a diagram showing the constitution of a region information database according to the present embodiment.
FIG. 3 is an explanatory view showing an operation of a location search system according to the present embodiment.

As shown in FIG. 2, the region information defines the spatial range (region) specified by the position coordinate information constituted of plane coordinates (Coordinates 1, 2) of two points. Concretely, for the spatial range, a vertical direction (height direction) is represented by a floor number (3F here), and a plane region is represented by the plane coordinate (Coordinates 1, 2) of two points. The plane coordinate (Coordinates 1, 2) of two points defines a rectangular range. For example, when Coordinate 1 of the position coordinate information is coordinate (10, 10), and Coordinate 2 is coordinate (40, 30), the region information (range code 00103) specifying the spatial range (region) corresponding to "Meeting Room A" which is a space name is searched.

Here, as a method of defining the region information, the region constituted of a plurality of spatial ranges defined by the plane coordinate (Coordinates 1, 2) of different two points is identified by the same spatial range identification information (range code). Concretely, for example, the spatial range (region) corresponding to "Laboratory B" which is a space name is constituted of a plurality of ranges 300, 301 specified by different position coordinate information.

The PC for management 30 can recognize that each spatial range corresponding to the same range code (00102) included in the region information supplied from the server 20 means, for example, the same region corresponding to "Laboratory B" which is the space name.

Moreover, for example, a spatial range 302 corresponding to "Stairwell" which is a space name is the same position coordinate information, but is different in the floor number (3F, 4F here) indicating the region of the height direction. Even in this case, the PC for management 30 can recognize that each spatial range corresponding to the same range code (00106) included in the region information means the same region corresponding, for example, to "Stairwell" which is the space name.

The server 20 transfers the location search information 200 including the position coordinate information, region information and map information indicating the corresponding map to the PC for management 30 from the search unit 25 (step S12).

As described above, the server 20 is capable of producing the location search information 200 including the region information for recognizing the location of the portable terminal 10 (i.e., the user's location) to supply the information to the PC for management 30.

(Operation of PC for Management 30)

Figure 5:
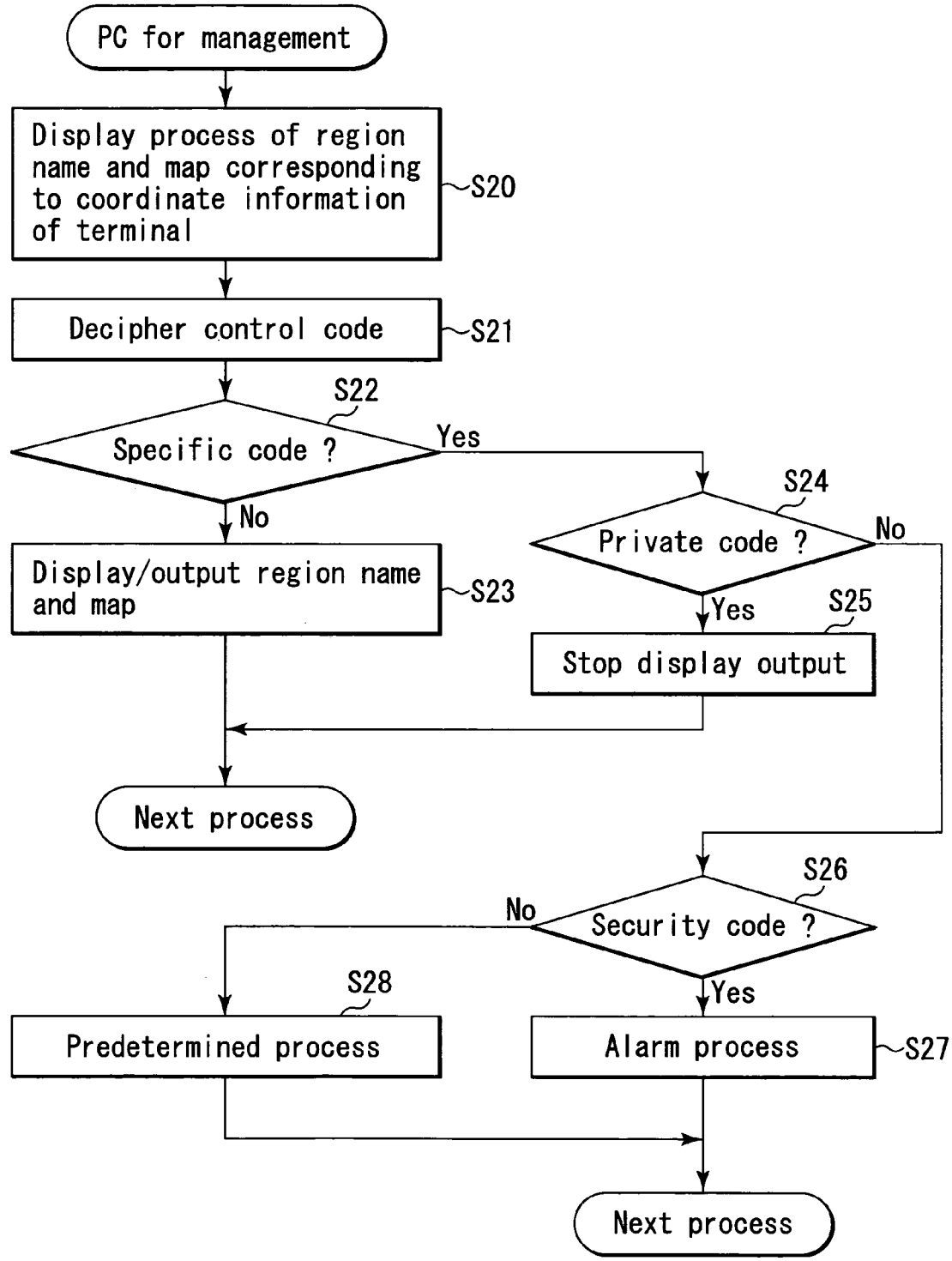
FIG. 5 is a flowchart showing the operation of PC for management according to the present embodiment.

Next, the operation of the PC for management 30 will be described with reference to the flowchart of FIG. 5.

On receiving the location search information 200 including the map information from the server 20, the PC for management 30 executes a process of displaying the location of the portable terminal 10 by the map display unit 33 on the display of the display device 32 (step S20).

Concretely, the map display unit 33 executes a display process so as to display a map image shown in FIG. 3 on the display and to plot the location of the portable terminal 10.

At this time, the PC for management 30 display the region (spatial range) corresponding to the location of the portable terminal 10 on the display of the display device 32 based on the region information from the server 20 so that the region can be confirmed. That is, the floor number and space name (region name) received in text data from the server 20 are displayed on the display. Therefore, a manager can confirm that the location of the user of the portable terminal 10 is, for example, "Laboratory B" on the display in real time.

Here, on receiving the location search information 200 for each portable terminal 10 from the server 20, the PC for management 30 can simultaneously display the locations of a plurality of portable terminals on the display.

Furthermore, the PC for management 30 executes not only the display process of the location of the portable terminal 10 but also a control process (function included in the software for management 31) based on the control information (control code) included in the region information (steps S21 to S28). As shown in FIG. 2, the control code is attribute information set beforehand for each region, and includes a specific code indicating a specific control process.

The PC for management 30 deciphers the control code included in the region information from the server 20 to recognize a content meant by the control code (step S21). When the control code is not a specific code, and the location of the portable terminal 10 is displayed on the display of the display device 32 (NO of step S22, S23).

On the other hand, when the control code is the specific code, the PC for management 30 executes the control process indicated by the specific code. Examples of the specific code include a private code indicating a private region, a security code indicating a security region requiring a security process.

Concretely, for example, when the control code is the private code set to the region corresponding to a space name "Bathroom", the PC for management 30 stops the display process (YES of step S24, S25). Therefore, since the location of the portable terminal 10 is prohibited from being displayed on the display of the display device 32, so-called privacy can be protected in a case where the user is in a private region.

Moreover, for example, when the control code is a security code set to the region corresponding to space name "Machine Room", the PC for management 30 executes a predetermined alarm process (YES of step S26, S27). Concretely, if the user enters the region "Machine Room" where entry is forbidden by mistake, the PC for management 30 executes a step of notifying an alarm with respect to the user's portable terminal 10, for example, via the server 20.

Furthermore, when the control code is another specific code, the PC for management 30 executes a predetermined process set beforehand for each specific code (NO of step S26, S28).

As described above, in short, in accordance with the present embodiment, it is possible to search the location of the portable terminal 10 by a region (spatial range) unit provided with the space name on the premises such as the office building.

Therefore, since the searched region can concretely be displayed using the map or the region name on the display of the display device 32 of the PC for management 30, the location of the user having the portable terminal 10 can easily be managed. In this case, when the control information (control code) is set to each region, the PC for management 30 is capable of executing various control processes in accordance with the user's location.

SECOND EMBODIMENT

In the wireless communications, reception situations sometimes change by changes of surrounding situations. Therefore, even the portable terminal 10 undergoes surrounding environment changes, and the situations of the received radio waves sometimes change. When the situations of the received radio waves change, received radio wave information measured by the radio wave measurement unit 12 also changes.

For the server 20, when the received radio wave information 100 from the portable terminal 10 changes, a phenomenon occurs in which the position coordinate calculated by the location detection unit 21 moves with an elapse of time. The movement of the position coordinate is one type of measurement error called a fluctuation.

Then, the present embodiment relates to the location search system having a function of correcting the measurement error of the position coordinate. Concretely, the search unit 25 included in the server 20 corrects the measurement error by the movement of the position coordinate, when searching the region information from the region information database 23.

Figures 6, 7:
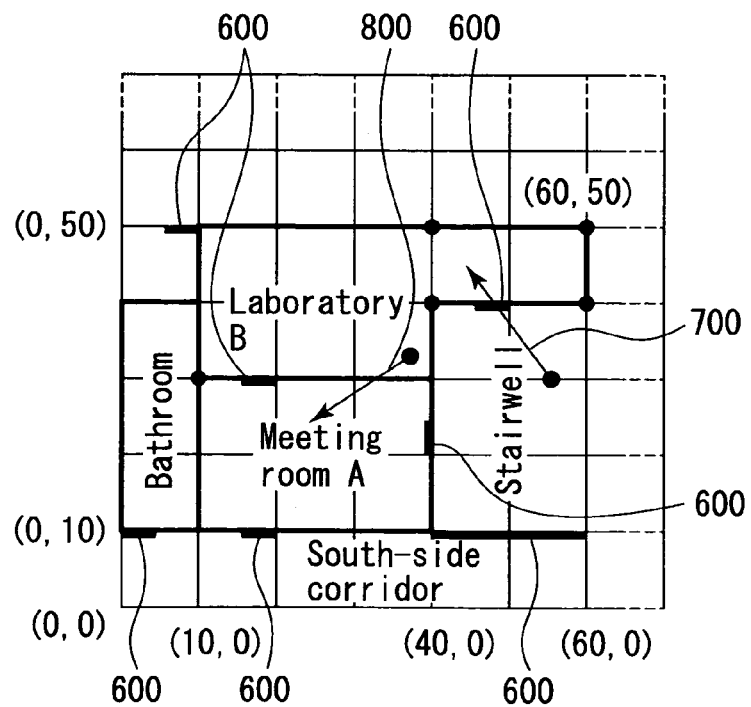
FIG. 6 is a diagram showing the constitution of the region information database according to a second embodiment.
FIG. 7 is an explanatory view of the operation of the location search system according to the second embodiment.
Figure 8:
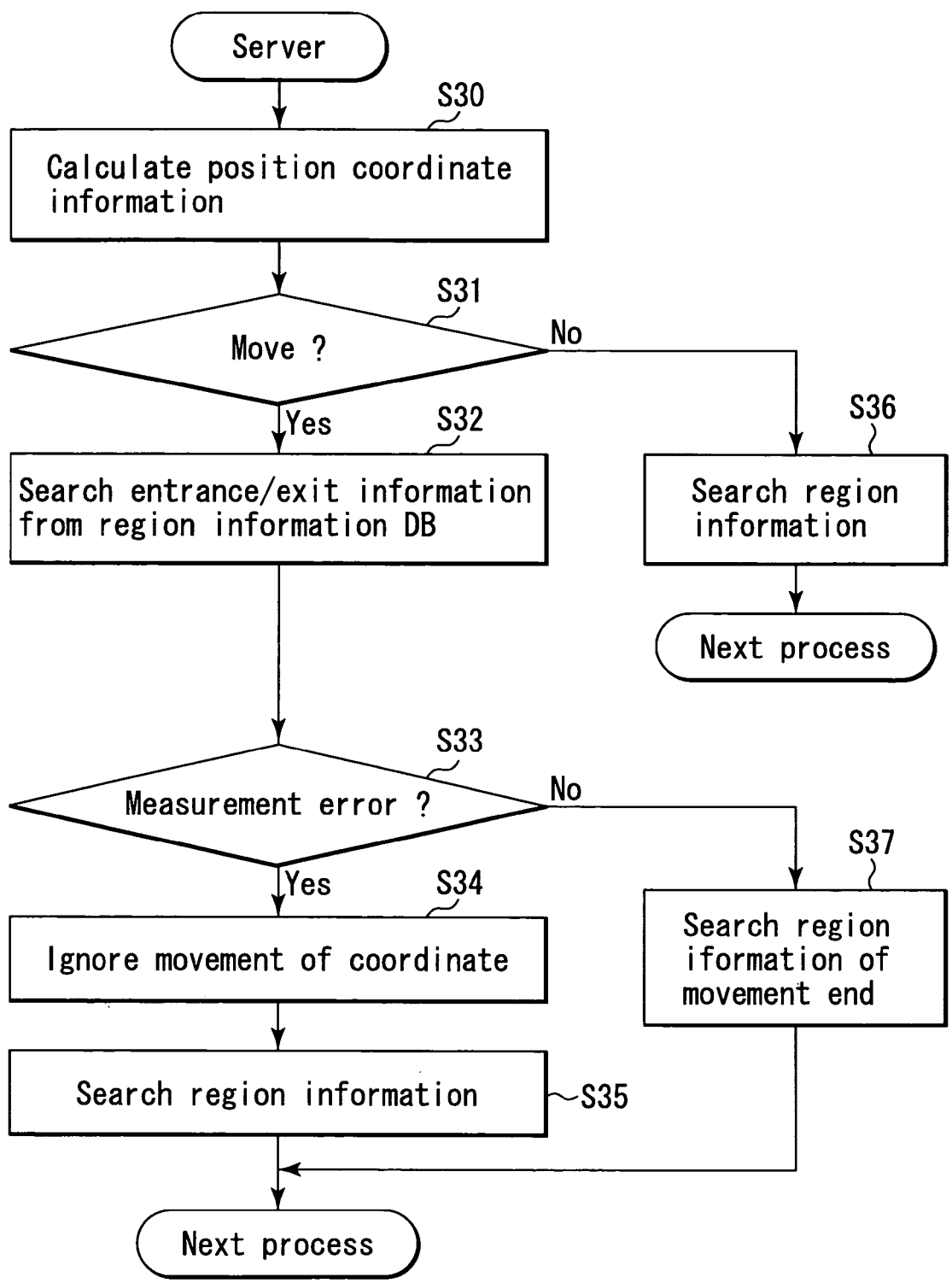
FIG. 8 is a flowchart showing the operation of the server according to the second embodiment.

In the present embodiment, as shown in FIG. 6, in the region information database 23, the position coordinate information of an entrance/exit (referred to as the entrance/exit information) indicating the entrance/exit (reference numeral 600 of FIG. 7) with respect to the regions such as the room is set. The search unit 25 judges the movement of the position coordinate corresponding to the measurement error based on the position coordinate information of the entrance/exit, and executes a correction step of ignoring the movement with the measurement error (see step S34 of FIG. 8).

When the location detection unit 21 calculates the position coordinate information, the server 20 detects the movement of the position coordinate in accordance with time changes (YES of steps S30, S31). When the movement is not detected, the server 20 shifts to the search step of the region information by the search unit 25 in the first embodiment (NO of step S31, S36).

On the other hand, when the movement of the position coordinate is detected, the search unit 25 searches the entrance/exit information corresponding to the position coordinate information calculated with the movement from the region information database 23 (step S32).

Furthermore, as shown in FIG. 7, for example, with a movement 700 of the position coordinate passing an entrance/exit 600 of the space name "Laboratory B", the search unit 25 judges that the portable terminal 10 (i.e., the user) actually moves, not the measurement error (NO of step S33). Therefore, the search unit 25 searches the region information of a movement end (Laboratory B here) (step S37).

On the other hand, as shown in FIG. 7, for example, with a movement 800 of the position coordinate passing a position corresponding to "wall" not the entrance/exit 600 of the space name "Meeting Room A", the search unit 25 judges the measurement error, and ignores the movement 800 of the position coordinate (YES of step S33, S34). Therefore, the search unit 25 searches the region information corresponding to the position coordinate information before the movement (Laboratory B here) from the region information database 23 (step S35).

As described above, in summary, in accordance with the second embodiment, the situations of the received radio waves in the wireless communications of the portable terminal 10 unstably change. Accordingly, when the movement of the position coordinate information (time change) occurs, the entrance/exit information included in the region information is used to execute a correction step of ignoring the movement.

Therefore, the server 20 can avoid a situation beforehand in which wrong region information by the measurement error is supplied to the PC for management 30. Accordingly, the PC for management 30 is capable of performing a stable location management process based on high-precision region information.

THIRD EMBODIMENT

Figure 9:
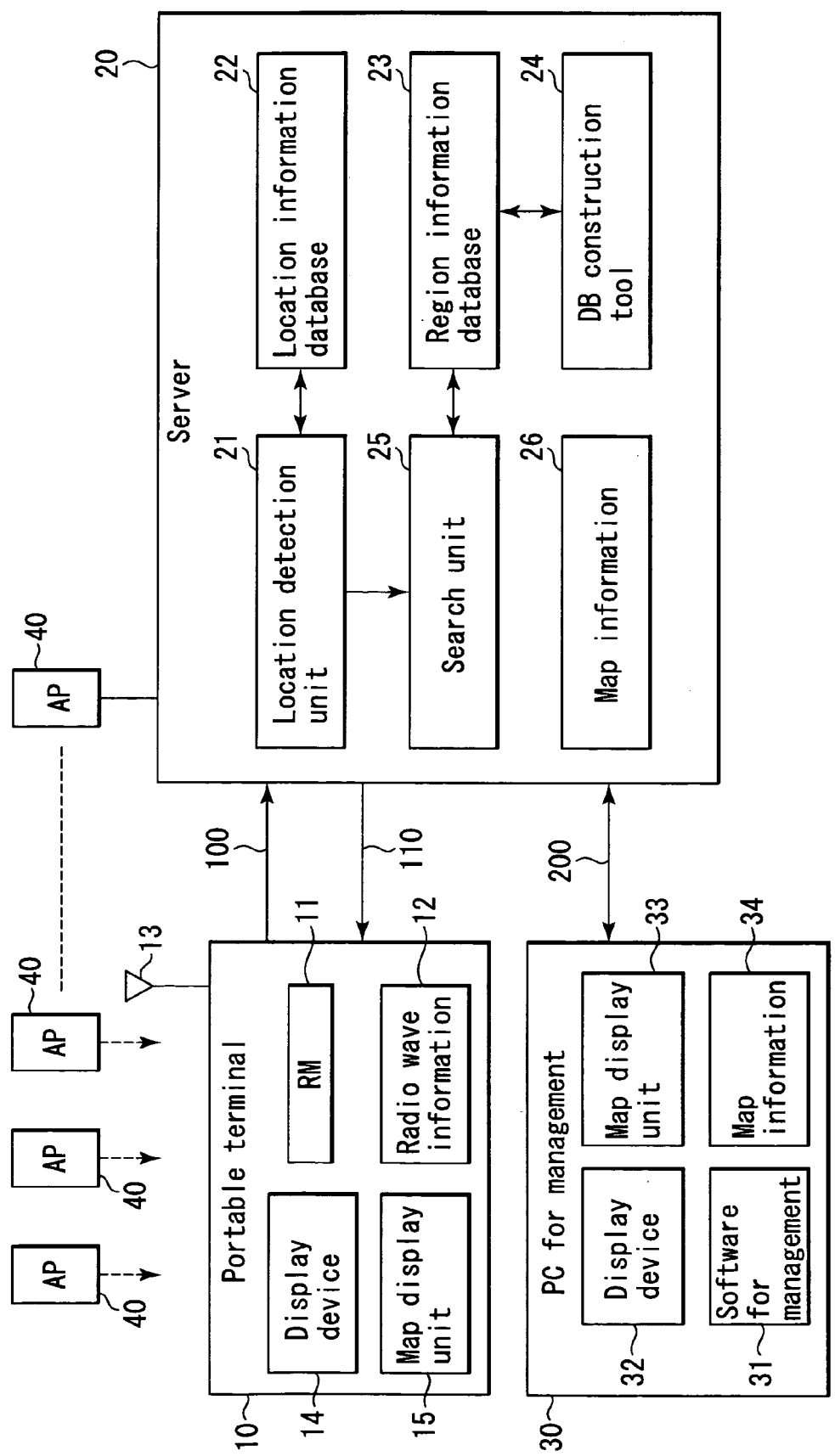
FIG. 9 is a block diagram showing the system constitution according to a third embodiment.

FIG. 9 is a block diagram showing the system constitution according to a third embodiment.

The first and second embodiments relates to the system for managing the locations of the users such as employees on the premises such as the office building. On the other hand, in the system of the present embodiment, the locations of the users such as guests are managed, and further guide information is supplied to the users on the premises such as the office building, shopping center, and public facilities.

To realize the system, in the present embodiment, as shown in FIG. 9, the portable terminal 10 having an information display function in addition to the wireless communications function is used. The portable terminal 10 may be prepared on the premises beforehand and lent to the guest.

The portable terminal 10 includes a display device 14 and a map display unit (map display engine) 15 in addition to the wireless communications circuit 11, radio wave measurement unit 12, and antenna for transmission/reception 13. The server 20 supplies the location search information 200 including the map information to the PC for management 30, and further supplies location search information 110 including the map information to the portable terminal 10.

By the above-described system constitution, the portable terminal 10 carried by the user such as the guest receives the location search information 110 including the map information from the server 20 in the same manner as in the PC for management 30. Therefore, the map display unit 15 displays the location of the portable terminal 10 (i.e., the user's location) on the display of the display device 14.

Concretely, the map display unit 15 executes the display process so as to display the map image for each floor on the premises on the display and to plot the location of the portable terminal 10.

At this time, the region (spatial range) corresponding to the location of the portable terminal 10 is displayed on the display of the display device 14 based on the region information from the server 20 so that the region can be confirmed. That is, the floor number and space name (region name) received in the text data from the server 20 are displayed on the display.

Therefore, the user's location is displayed in a concrete region name (e.g., a south-side corridor of the floor 3F) on the display of the display device 14 of the portable terminal 10 with respect to the users such as the guests who are strangers on the premises so that guiding is possible.

FOURTH EMBODIMENT

Figure 10:
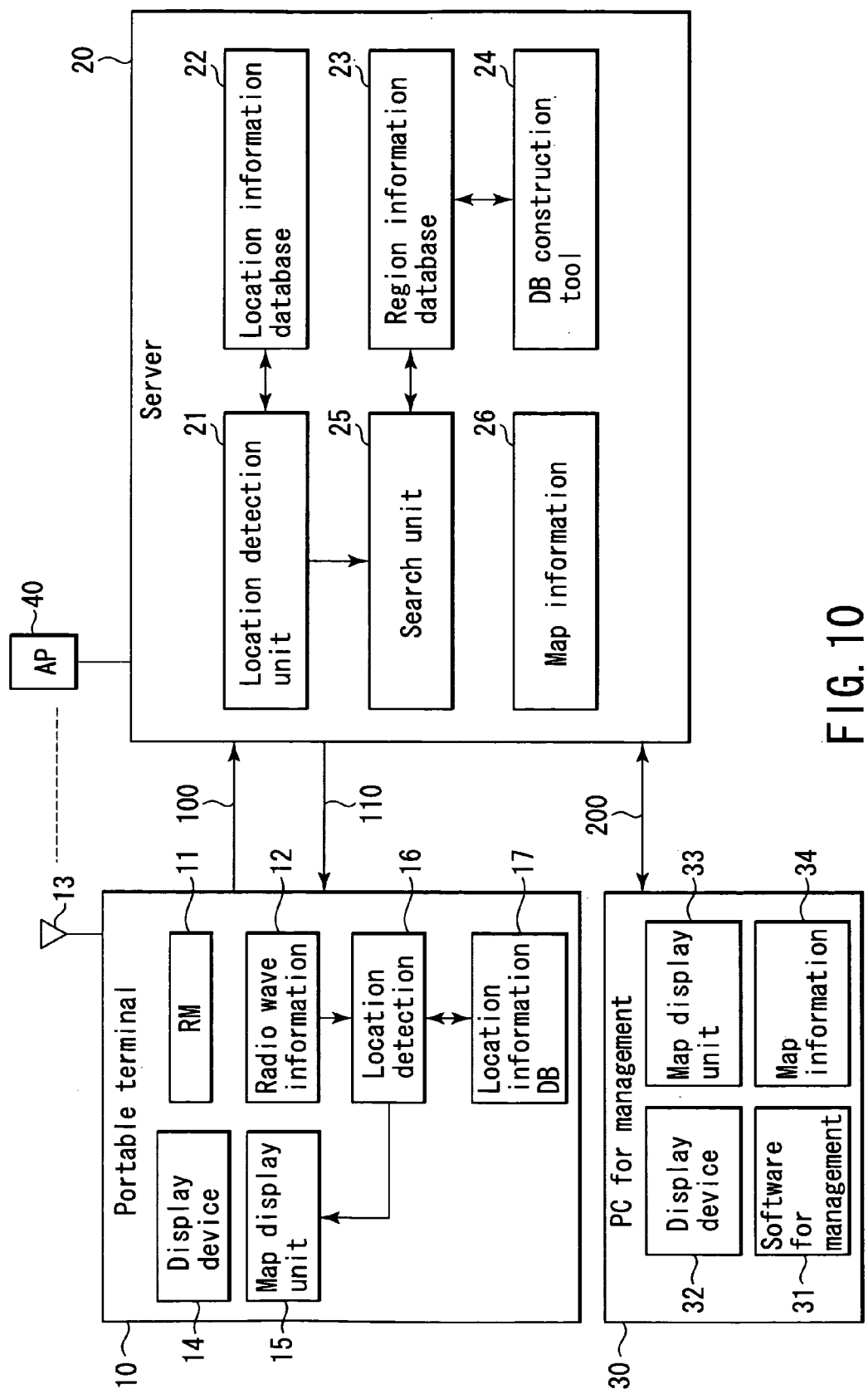
FIG. 10 is a block diagram showing the system constitution according to a fourth embodiment.

FIG. 10 is a block diagram showing the system constitution according to a fourth embodiment.

In the present embodiment, as shown in FIG. 10, the portable terminal 10 is used including a location detection unit 16 and a location information database 17 in addition to the wireless communications circuit 11, radio wave measurement unit 12, antenna for transmission/reception 13, display device 14 and map display unit (map display engine) 15. The location detection unit 16 and the location information database 17 are constituting elements corresponding to the location detection unit 21 and the location information database 22 possessed by the server 20. It is to be noted that the portable terminal 10 may be prepared on the premises beforehand and lent to the guest in the same manner as in the third embodiment.

By the above-described system constitution, the portable terminal 10 carried by the user such as the guest calculates the position coordinate information of the portable terminal 10 from the location information database 17 based on the received radio wave information outputted from the radio wave measurement unit 12 in the same manner as in the server 20. The portable terminal 10 transmits the received radio wave information 100 including the position coordinate information to the server 20. For the server 20, the search unit 25 searches the region information from the region information database 23 based on the position coordinate information transmitted from the portable terminal 10.

Moreover, the server 20 supplies the location search information 200 including the map information to the PC for management 30, and further supplies the location search information 110 including the map information to the portable terminal 10. It is to be noted that only with the portable terminal 10, the location of the terminal may be plotted on the drawing of the map. When there is not drawing data of the map in the portable terminal 10, only the data may also be acquired from the server 20.

With the constitution of the present embodiment, the server 20 is capable of producing the location search information 110, 200 to supply the information to the portable terminal 10 and PC for management 30 without performing the process of the location detection unit 21. Therefore, the portable terminal 10 carried by the user such as the guest is capable of receiving the location search information 110 including the map information from the server 20 to display the location of the portable terminal 10 (i.e., the user's location) on the display of the display device 14 in the same manner as in the PC for management 30. Accordingly, the user's location is displayed in the concrete region name (e.g., the south-side corridor of the floor 3F) on the display of the display device 14 of the portable terminal 10 with respect to the users such as the guests who are strangers on the premises so that the guiding is possible.

(Construction of Region Information Database)

Figure 11:
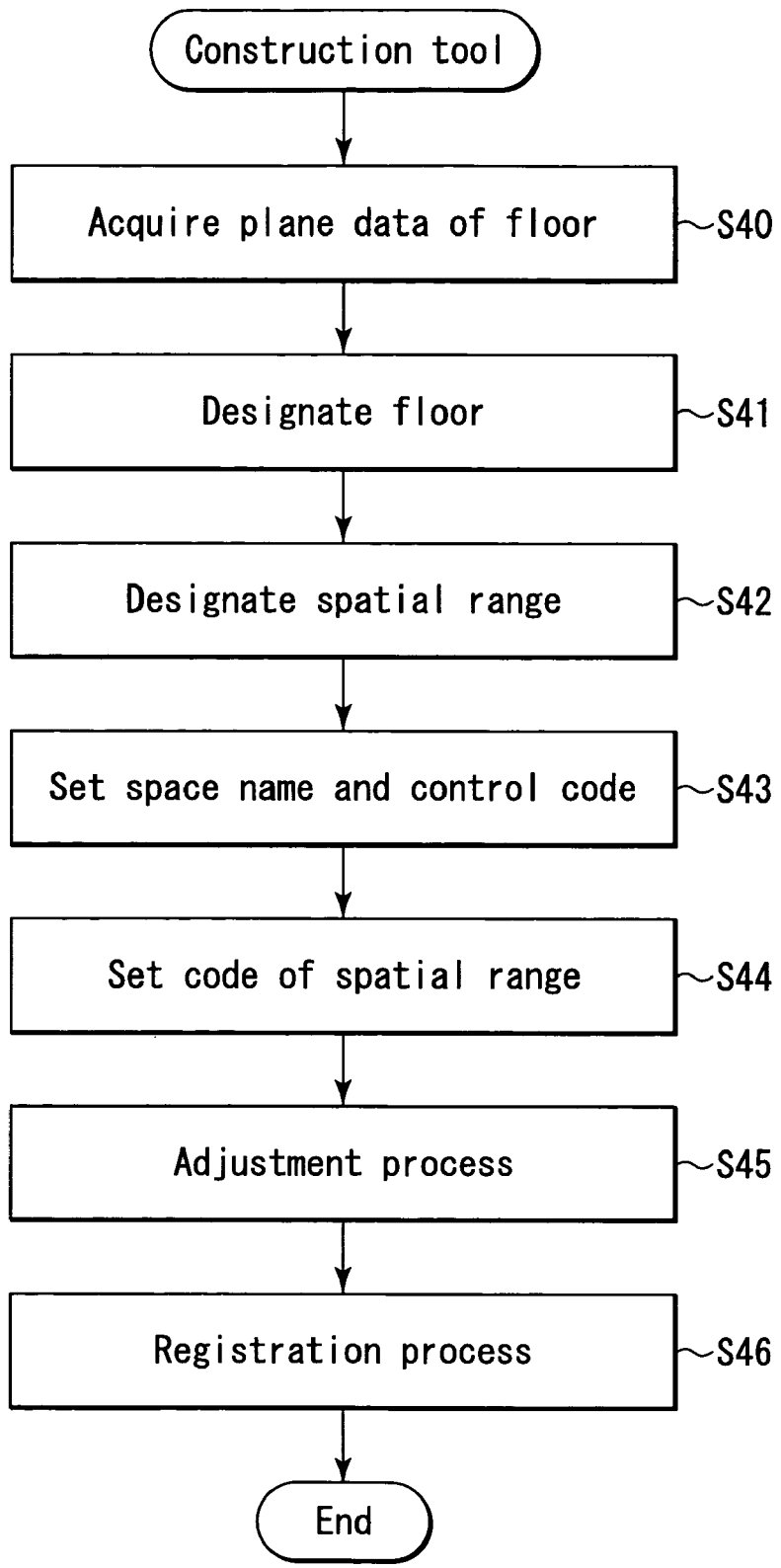
FIG. 11 is a flowchart showing the operation of a database construction tool according to each embodiment.

FIG. 11 is a flowchart showing a process procedure of a database (DB) construction tool 24 which constructs the region information database 23 owned by the server 20 according to the above-described embodiments.

The tool 24 is usually accessed and started via the PC for management 30 to execute maintenance of the region information database 23. Concretely, the tool 24 designates the spatial range to be registered in the region information database 23 to register the control information (control code) or the region name (space name).

First, the tool 24 takes in plan view data of the floor to designate the floor (steps S40, S41). Outdoors, a ground floor (first floor) is designated. Furthermore, the tool 24 inputs scales in longitudinal and transverse directions of the plan view of the floor. Concretely, two points in a horizontal or vertical direction on the displayed map are designated, and a distance is inputted. Moreover, the tool 24 designates the spatial range (region) such as the room by a pointing device in the PC for management 30 (step S24).

In the designation process of the spatial range, for the input, rectangle designation by two points designation, polygon designation by multi-point designation, fan-shape designation by designation of central point and radius and angle, ellipse designation by two points designation, and curve designation by free hand are possible. The tool 24 sets "space name" and "control code" corresponding to the designated spatial range (step S43).

Furthermore, the tool 24 designates spatial range identification information (range code) to register the information in the region information database 23 including a case where the designated spatial range is designated with a combination of a plurality of ranges (steps S44 to S46). At this time, the tool 24 executes the following adjustment process (step S45).

That is, the combined spatial range automatically sets the same range code. When the designated spatial range overlaps with the spatial range already designated, the user is required to confirm this, and the range is overwritten as a modification. When the existing spatial range is segmented by the overwriting, the "space name" and "control code" are requested to be set with respect to the segmented spaces.

Moreover, a plurality of spatial ranges are designated and combined to set one spatial range, the "space name" and "control code" are selected from the existing data or newly inputted. When the spatial range extending over a plurality of adjacent floors, such as "stairwell", is designated, the corresponding spatial range is set for each floor, and the spatial ranges to be combined next is designated.

FIFTH EMBODIMENT

FIGS. 12 to 15 are diagrams relating to a fifth embodiment. The present embodiment relates to a location search system having a function of correcting the measurement error of the position coordinate based on schedule information.

As described above, in the wireless communications, the reception situations sometimes changes with the change of the surrounding situation. Therefore, even the portable terminal 10 undergoes the surrounding environment change, and the situations of the received radio waves sometimes change. When the situations of the received radio waves change, the received radio wave information measured by the radio wave measurement unit 12 also changes. In the server 20, when the received radio wave information 100 from the portable terminal 10 changes, the phenomenon occurs in which the position coordinate calculated by the location detection unit 21 moves with the elapse of time. The movement of the position coordinate is one type of measurement error called the fluctuation.

Then, when searching the region information from the region information database 23, the search unit 25 included in the server 20 of the present embodiment refers to the schedule information stored in the storage unit 26 to judge whether or not the position coordinate information calculated by the location detection unit 21 is the measurement error.

Figure 12:
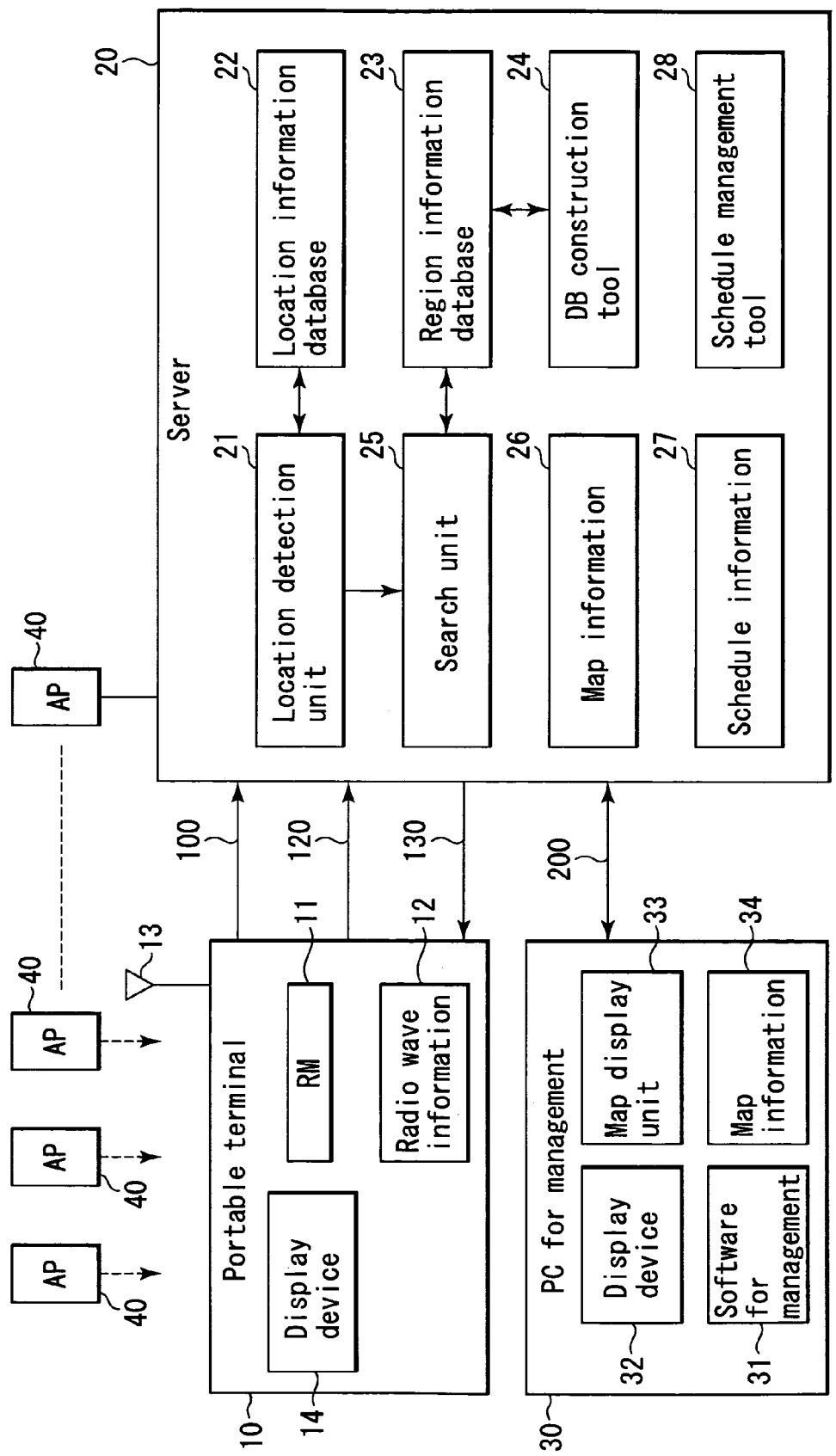
FIG. 12 is a block diagram showing the system constitution according to a fifth embodiment.

In the present embodiment, as shown in FIG. 12, the server 20 has a schedule management tool 28 which manages the schedule information. As shown in FIG. 13, the schedule management tool 28 manages (records or searches) the schedule information associated with the region information of the region information database 23. The operation of the present embodiment will hereinafter be described mainly with reference to a flowchart of FIG. 15.

For the server 20, when the location detection unit 21 calculates the position coordinate information, the search unit 25 shifts to the search step of the region information from the region information database 23 (step S50). At this time, the search unit 25 refers to the schedule information shown in FIG. 13 via the schedule management tool 28 (step S51). Here, the search unit 25 obtains the present time (time) T, and confirms the schedule (used region) of the user having the portable terminal 10 from the schedule information (step S52). Here, it is assumed that the user is scheduled to be in a meeting in Meeting Room A (spatial range 304) of the floor 3F as shown in FIG. 14.

When the region information searched based on the position coordinate information includes the region 304 designated by the schedule information (the space name is Meeting Room A), the search unit 25 shifts to the step of supplying the region information to the PC for management 30 (YES of step S53). That is, as shown in FIG. 14., even when the position coordinate information indicates movement 900, a region 304 agreeing with the schedule information is recognized as the user's location.

On the other hand, when the position coordinate information indicates movement 1000 outside the region 304 (Meeting Room A) as shown in FIG. 14, the search unit 25 judges whether or not the movement is the measurement error from the region information searched based on the position coordinate information (step S54). In this case, when the movement 1000 of the position coordinate information does not exceed reference time (RT) with respect to the present reference time (RT), the search unit 25 judges that the movement 1000 of the position coordinate information is the measurement error (YES of step S54).

When judging that the movement is the measurement error, the search unit 25 corrects the position coordinate information in a range of the region 304 (Meeting Room A) based on the schedule information, and shifts to a process of supplying the region information indicating that the space name is Meeting Room A to the PC for management 30 (step S55).

On the other hand, when the movement 1000 of the position coordinate information exceeds the reference time (RT), the search unit 25 judges the region designated by the position coordinate information as an actual location (NO of step S54). Therefore, the search unit 25 shifts to a search process of the region information from the region information database 23 based on the position coordinate information calculated by the location detection unit 21 regardless of the schedule information (step S56).

In this case, when the position coordinate information is stable outside the region 304 (Meeting Room A) only for a certain time, the search unit 25 may execute a process of changing the space name of the schedule information via the schedule management tool 28. That is, as shown in FIG. 13, the region information (range code and space name) corresponding to the time (11:00 to 12:00) is changed based on the actual region information.

As described above, in short, in accordance with the fifth embodiment, when the situations of the received radio waves unstably change in the wireless communications of the portable terminal 10, and accordingly the movement (change with time) of the position coordinate information occurs, the correction step of the position coordinate information is executed based on the schedule information. Therefore, the server 20 can avoid a situation in which the wrong region information by the measurement error is supplied to the PC for management 30 beforehand. Accordingly, the PC for management 30 is capable of the stable location management step based on the high-precision region information.

As described above, in accordance with the respective embodiments, there can be provided a location search system capable of securely searching a location of a portable terminal especially by a region unit on the premises.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A system for location search of a data processing device including a wireless communications unit and a unit to output received radio wave information for location detection, the system comprising:
    a unit which acquires the received radio wave information from the data processing device by wireless communications;
    a location detection unit which calculates position coordinate information to specify a location of the data processing device based on the received radio wave information;
    a region information database in which region information is stored to designate a spatial range associated with the position coordinate information, the region information database storing space identification information which specifies the spatial range associated with the position coordinate information, and the region information including control information indicating a predetermined control process for the spatial range; and
    a search unit which searches the region information corresponding to the position coordinate information calculated by the location detection unit from the region information database.

2. The system according to claim 1, wherein the region information database stores space identification information specifying the spatial range associated with the position coordinate information and the region information including control information indicating a predetermined process for each spatial range,
    the system further comprising:
    a computer system which manages the location of the data processing device; and
    means for transferring the position coordinate information and the region information to the computer system,
    the computer system including:
        a unit which uses the position coordinate information and the region information to produce display information capable of confirming the location of the data processing device;
        a display device which displays the display information on a display; and
        a controller which executes the predetermined control process set for the spatial range corresponding to the location of the data processing device in accordance with the control information.

3. The system according to claim 2, wherein the controller executes a control so as to prohibit the display information from being displayed or to change the display information to a predetermined content, based on the control information.

4. The system according to claim 1, further comprising:
    a controller which executes a predetermined alarm process, when the control information indicates an alarm.

5. A system for location search of a data processing device including a wireless communications unit and a unit to output received radio wave information for location detection, the system comprising:
    a unit which acquires the received radio wave information from the data processing device by wireless communications;
    a location detection unit which calculates position coordinate information to specify a location of the data processing device based on the received radio wave information;
    a region information database in which region information is stored to designate a spatial range associated with the position coordinate information, the region information database storing the region information including space identification information specifying the spatial range associated with the position coordinate information,
    the space identification information including:
        a space name allocated to the spatial range;
        range identification information which identifies a spatial range set for each of a plurality of different position coordinate information and which indicates the same content when a plurality of spatial ranges specified by the plurality of different position coordinate information are treated as the same spatial range; and
    entrance/exit information indicating a position coordinate of an entrance/exit with respect to the spatial range; and
    a search unit which searches the region information corresponding to the position coordinate information calculated by the location detection unit from the region information database,
    the search unit including movement detection means for detecting that the data processing device has moved to a different spatial range based on the position coordinate information calculated by the location detection unit,
    wherein the search unit ignores a movement detected by the movement detection means as an error if, when searching the region information from the region information database based on the position coordinate information calculated by the location detection unit, the search unit judges that the data processing device has moved to the different spatial range through a range other than the entrance/exit indicated by the entrance/exit information.

6. A method of location search of a data processing device including a wireless communications unit and a unit to output received radio wave information for location detection, the method comprising:
    calculating position coordinate information to specify a location of the data processing device based on the received radio wave information acquired from the data processing device by wireless communications;
    referring to a region information database in which region information is stored to designate a spatial range associated with the position coordinate information;

searching the region information corresponding to the position coordinate information from the region information database, the region information database storing space identification information to specify the spatial range associated with the position coordinate information, and the region information including control information indicating a predetermined control process for the spatial range;

transferring the position coordinate information and the region information to a computer system which manages the location of the data processing device, the computer system using the position coordinate information and the region information to display information capable of confirming the location of the data processing device on a display; and executing the predetermined control process for the spatial range corresponding to the location of the data processing device in accordance with the control information.

7. A method of location search of a data processing device including a wireless communications unit and a unit to output received radio wave information for location detection, the method comprising:

calculating position coordinate information to specify a location of the data processing device based on the received radio wave information acquired from the data processing device by wireless communications; and referring to a region information database in which region information is stored to designate a spatial range associated with the position coordinate information, and searching the region information database for the region information corresponding to the position coordinate information, the region information database storing space identification information to specify the spatial range associated with the position coordinate information, and the region information including entrance/exit information indicating a position coordinate of an entrance/exit with respect to the spatial range;

detecting that the data processing device has moved to a different spatial range based on the position coordinate information; and ignoring a detected movement as an error when searching the region information from the region information database based on the position coordinate information and judging that the data processing device has moved to the different spatial range through a range other than the entrance/exit indicated by the entrance/exit information.

* * * * *